(12) United States Patent
Stephenson

(10) Patent No.: US 6,829,045 B2
(45) Date of Patent: Dec. 7, 2004

(54) REWRITABLE DISPLAY HAVING A DIELECTRIC SPACING LAYER

(75) Inventor: Stanley W. Stephenson, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 502 days.

(21) Appl. No.: 09/799,220

(22) Filed: Mar. 5, 2001

(65) Prior Publication Data

US 2002/0135707 A1 Sep. 26, 2002

(51) Int. Cl.[7] .................................................. G09G 5/00
(52) U.S. Cl. ...................................................... 356/108
(58) Field of Search .......................... 365/108; 349/115, 349/86, 20, 1; 345/176

(56) References Cited

U.S. PATENT DOCUMENTS

| | | | |
|---|---|---|---|
| 4,435,047 A | | 3/1984 | Fergason |
| 4,752,820 A | * | 6/1988 | Kuroiwa et al. ............. 365/108 |
| 5,040,296 A | | 8/1991 | Yerger |
| 5,437,811 A | | 8/1995 | Doane et al. |
| 5,727,818 A | | 3/1998 | Schmeida |
| 6,065,701 A | | 5/2000 | Tanimura et al. |
| 6,201,587 B1 | * | 3/2001 | Sakamaki .................... 349/86 |
| 6,580,481 B2 | * | 6/2003 | Ueda et al. ................. 349/115 |

* cited by examiner

Primary Examiner—John Niebling
Assistant Examiner—Andre' C. Stevenson
(74) Attorney, Agent, or Firm—Raymond L. Owens; Kathleen Neuner Manne

(57) ABSTRACT

An audio-visual storage unit having an electronically written display indicating a rental return time.

13 Claims, 5 Drawing Sheets

US 6,829,045 B2

REWRITABLE DISPLAY HAVING A DIELECTRIC SPACING LAYER

CROSS REFERENCE TO RELATED APPLICATIONS

Reference is made to commonly-assigned U.S. patent application Ser. No. 09/799,378 filed concurrently herewith, entitled "Recording Rewritable Time Related Information on a Label" by Stanley W. Stephenson, the disclosure of which is incorporated herein by reference.

FIELD OF THE INVENTION

The present invention relates to a display having writable segments and uses cholesteric liquid crystal material.

BACKGROUND OF THE INVENTION

Audio-visual (A/V) recordings, such as movies, can be stored on a variety of media. Currently, such recordings are stored on video cassette record (VCR) tapes or Digital Video Disk (DVD) optical storage disks. Such media is subject to damage and is typically stored in a storage case. Agencies have been developed to provide rental of such recordings on either type of storage media. A renter pays an agency to posses a given recording for a given time period. Agencies rent storage cassettes for variable amounts of time at different prices. Such agencies also rent computer games at a price for a given time period. Financial penalties are be assessed if the media cassette is not returned by a certain return time. It would be useful to display that return time on the storage cassette to prevent late fees.

Currently, a paper receipt is provides a record of the return time to a customer for a given cassette. Alternatively, an adhesive label with the return time could be applied to the case. U.S. Pat. No. 5,040,296 discloses and adhesive label for a VCR cassette having a permanent set of indicia printed and covered with a surface that permits erasable marking. An alternative method is shown in U.S. Pat. No. 5,727,818 wherein indicia formed by pressure from a pointed tip are erased by lifting the protective sheet.

An electronic label is disclosed in U.S. Pat. No. 6,065,701. An adhesive label can be applied to a VCR cassette. The label contains an antenna and integrated circuit that permits the exchange of data between the circuit on the label. The unit can store and transmit data but does not permit a renter to visually determine a return date.

Fabrication of flexible, electronically written display sheets are disclosed in U.S. Pat. No. 4,435,047. A first sheet has transparent ITO conductive areas and a second sheet has electrically conductive inks printed on display areas. The sheets can be glass, but in practice have been formed of Mylar polyester. A dispersion of liquid crystal material in a binder is coated on the first sheet, and the second sheet is bonded to the liquid crystal material. Electrical potential applied to opposing conductive areas operate on the liquid crystal material to expose display areas. The display uses nematic liquid crystal material which ceases to present an image when de-energized.

U.S. Pat. No. 5,437,811 discloses a light-modulating cell having a polymer dispersed chiral nematic liquid crystal. The chiral nematic liquid crystal has the property of being driven between a planar state reflecting a specific visible wavelength of light and a light scattering focal-conic state. Said structure has the capacity of maintaining one of the given states in the absence of an electric field.

SUMMARY OF THE INVENTION

It is an object of the present invention to provide a display suitable for use as a display on an article and that can be changed by providing appropriate electrical fields to the display.

This object is achieved by a rewritable display, comprising:

a) a transparent substrate;

b) a first transparent conductor over such substrate;

c) a layer including cholesteric liquid crystal material;

d) a dielectric layer having openings;

e) a second conductor provided over the dielectric layer and into the openings to be in contact with the cholesteric liquid crystal bearing layer which is effective at the position in such openings to be in at least first and second optical states so that written and viewed, be electrically changed by providing appropriate electrical fields to the material; and f) means for electrically addressing the cholesteric liquid crystal layer to erase previous information and writing appropriate information.

The present invention provides a structural arrangement with openings in the dielectric layer so that a cholesteric liquid crystal material can be easily addressed to write, rewrite and erase information.

It is a further feature that displays in accordance with the present invention are particularly suitable for use on articles or rental devices which provide a user with time information related to their use of the rental device.

An advantage of the present invention is that the device can be a rental media cassette, such as an optical disk or magnetic tape.

DETAILED DESCRIPTION OF THE PREFERRED EMBODIMENT

Figure 1:
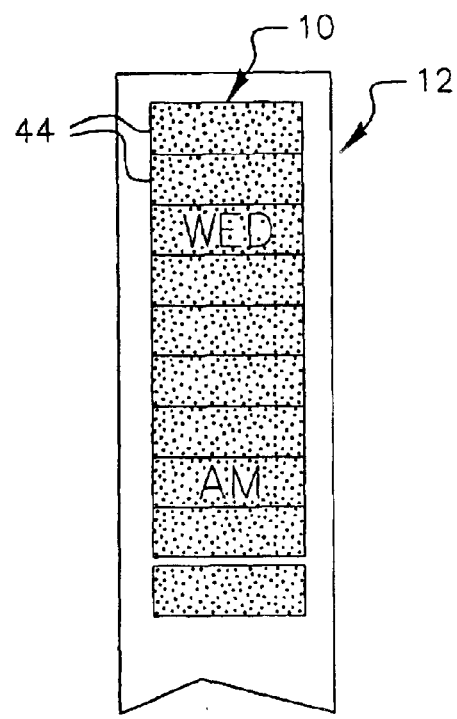
FIG. 1 is a front view of a display in accordance with the present invention attached to media cassette.

FIG. 1 is a front view of a display 10 in accordance with the present invention attached to media cassette 12 that permits a user to conveniently view time related information concerning a rental device. The time related information will include the return time for the media cassette 12. Display 10 has a set of segments corresponding to the 7 days of the week and the abbreviation AM and PM to indicate a time of day. Display 10 is attached or fixed using adhesive to media cassette 12 and can be electronically updated using contact pads 44. The display 10 can also be formed as part of an article. Media cassette 12 is, for example, a rental unit that should be returned before the time shown on display 10. When the display is attached to the article it can be referred to as a label which has rewritable time related information that can be written, rewritten and viewed. It will be understood that the display 10, when functioning as a label, is associated with an article. For example, the display 10 can be attached to either the article which functions as a device to be used, such as media cassette 12 or some rental device or a container which contains the media cassette 12 or rental device or is associated with such a device.

Figure 2:
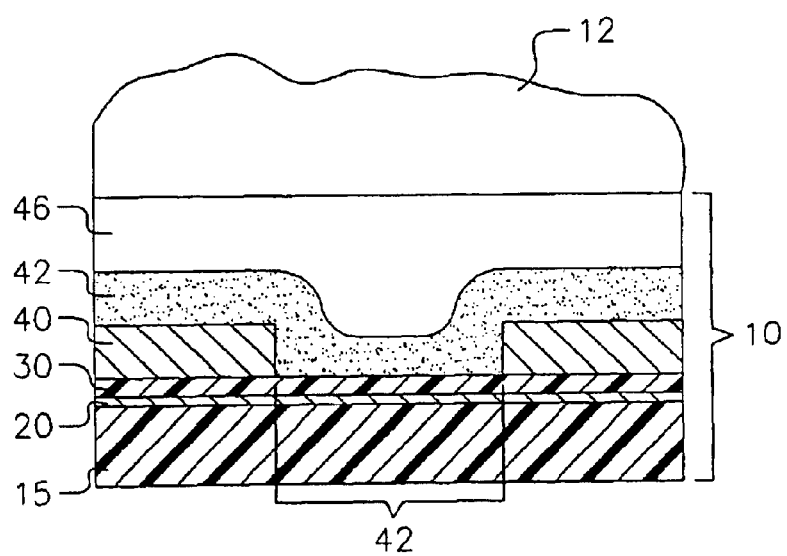
FIG. 2 is a sectional view of the display of FIG. 1.

FIG. 2 is a sectional view of display in FIG. 10. Display 10 includes a flexible substrate 15, which is a thin transparent polymeric material, such as Kodak Estar film base formed of polyester plastic that has a thickness of between 20 and 200 microns. In an exemplary embodiment, substrate 15 can be a 125-micron thick sheet of polyester film base. Other polymers, such as transparent polycarbonate can also be used.

First transparent conductor 20 is formed over substrate 15. First transparent conductor 20 can be Tin-Oxide or Indium-Tin-Oxide (ITO), with ITO being the preferred material. Typically the ITO comprising first transparent conductor 20 is sputtered as a layer over substrate 15 to form a layer having a sheet resistance of less than 250 ohms per square. The conductor 20 forms a part of each of the segments and typically is grounded.

An optical state changing layer is formed by coating a light modulating layer 30 onto first conductor 20. In the preferred embodiment, light modulating layer 30 is a polymer dispersed cholesteric liquid crystal. Cholesteric materials can be created that have peak reflectance from the infrared through the visible spectrum by varying the concentration of chiral dopant in a nematic liquid crystal. Application of electrical fields of various intensities and duration can drive a chiral nematic material (cholesteric) into a reflective state, a transmissive state or an intermediate state. These materials have the advantage of maintaining a given state indefinitely after the field is removed. Such materials can be cholesteric liquid crystal materials can be Merck BL112, BL118 or BL126, available from EM Industries of Hawthorne, N.Y. Therefore in accordance with the invention, the material (which can be cholesteric liquid crystal) is effective in at least first and second optical states so that the time related information can be written and viewed. The time related information relates to usage or potential usage of the article or a device associated with the article and such time related information can be electrically changed by providing appropriate electrical fields to the material.

Figure 3:
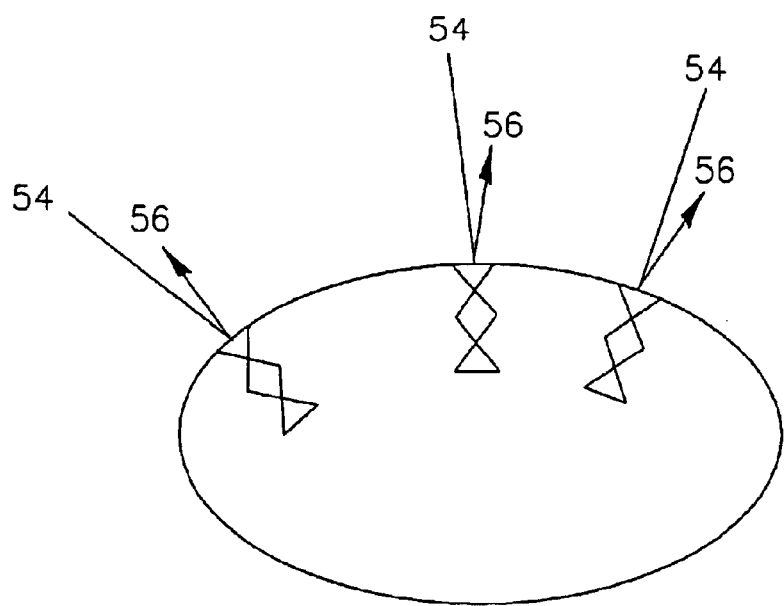
FIG. 3 is a sectional view of a domain of cholesteric liquid crystal in a polymer matrix.

In an exemplary embodiment, light modulating layer 30 is a cholesteric material dispersed in de-ionized photographic gelatin. The liquid crystal material is dispersed at 8% concentration in a 5% de-ionized gelatin aqueous solution. It has been found that 10-micron diameter domains of the cholesteric liquid crystal in aqueous suspension optimize the electro-optical properties of the cholesteric materials. FIG. 3 is a sectional view through a polymer dispersed cholesteric domain showing that portions of incident light 54 at a given wavelength will become reflected light 56. The encapsulation process provides a pressure resistant material that improves the viewing angle of the cholesteric liquid crystal. The first surface of light modulating layer 30 is coated over first transparent conductor 20 to provide a 10-micron thick polymer dispersed cholesteric coating. Other organic binders such as polyvinyl alcohol (PVA) or polyethylene oxide (PEO) can be used as the polymeric agent. Such compounds are can be coated on equipment associated with photographic films.

Figure 4:
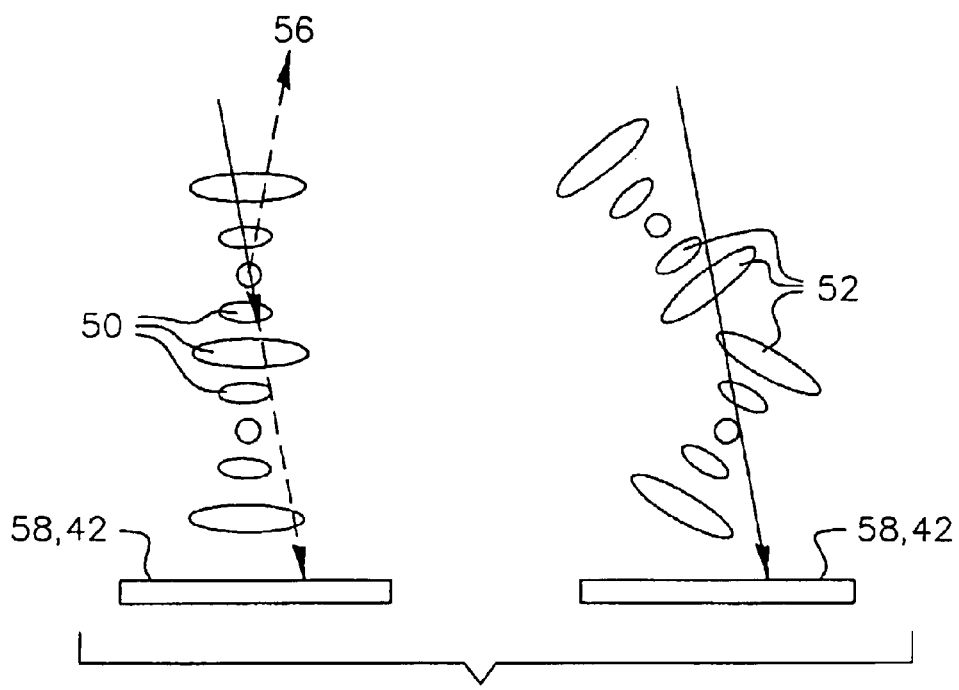
FIG. 4 is a view of the optical characteristics of cholesteric liquid crystal in each of two stable states.

FIG. 4 shows two stable states of cholesteric liquid crystals. On the left, a high planar voltage V2 been applied and quickly switched to zero potential, which applies and electric field that converts cholesteric liquid crystal to planar liquid crystal 50. Portions of incident light 54 striking planar liquid crystal 50 becomes reflected light 56 to create a bright image. On the right, application of a lower focal-conic voltage V1 applies an electric field that converts cholesteric liquid crystal to transparent focal-conic liquid crystal 52. Incident light 54 striking focal-conic liquid crystal 52 is transmitted. A light absorber 58 will absorb incident light 54 to create a dark image in areas having focal-conic liquid crystal 52. As a result, a viewer perceives an image having bright and dark areas depending on if the cholesteric material is planar liquid crystal 50 or focal-conic liquid crystal 52, respectively. A display 10 having light modulating layer 30 needs to have one transparent conductor and one light absorbing conductor. In the first exemplary embodiment, first transparent conductor 20 is transparent ITO.

For the exemplary embodiment, assume the display 10 requires 10 volts per micron thickness to convert the cholesteric material into the planar state. For an 8 micron layer, planar voltage V2 should be an 80 volt pulse for approximately 20 milliseconds converts cholesteric liquid crystals into the planar state. A pulse of about half the field strength, or 5 volts per micron converts the liquid crystal to the focal-conic state. If field carrying electrodes are spaced apart by a dielectric layer, then the field strength is reduced.

Returning to FIG. 2, a dielectric layer 40 is screen printed over light modulating layer 30. Dielectric layer 40 can be a 25 micron thick layer of Electrodag 25208 screen printable, UV curable dielectric coating from Acheson Corporation. The material is thermoplastic that is screen printable and hardens exposed to 0.3–0.6 joules/cm$^2$ of ultra violet radiation. A dielectric layer 40 screen printed at 25 microns thickness reduces the field strength to reduce planar pulse to less than the 5 volts per micron focal-conic field strength. Openings 41 in dielectric layer 40 to define image areas, which are coincident with the openings 41. Since the image is viewed through substrate 15, the indicia are mirror-imaged.

Second conductors 42 are then printed over dielectric layer 40. Second conductors 42 can be formed of a 25 micron thick layer of Electrodag 423SS screen printable electrical conductive material from Acheson Corporation. The material is finely divided graphite particles in a thermoplastic resin. The effective sheet conductivity of a 25 micron printed layer is than 250 ohms per square. Such a layer is light absorbing, typically having an optical density of greater than 2.0 D. The light absorbing property of the second conductor 42 is adequate to serve as light absorber 58 for the cholesteric liquid crystal material.

In each of the image areas under openings 41, second conductor 42 directly contacts light modulating layer 30. A planar voltage V2 applied between first transparent conductor 20 and second conductor 42 in an image area will have a10 volts per micron field strength and convert cholesteric liquid crystals in light modulating layer 30 to planar liquid crystals 50. Areas having a 25 micron thick dielectric layer 40 will only experience 2.8 volts per micron and cannot be switched to the planar state if a 100 volt pulse is applied between first transparent conductor 20 and second conductor 42. The display 10 is arranged so that display 10 can be viewed only through the transparent substrate. An adhesive 46 is applied to the back of the label, which bonds display 10 to media cassette 12.

Figure 5A:
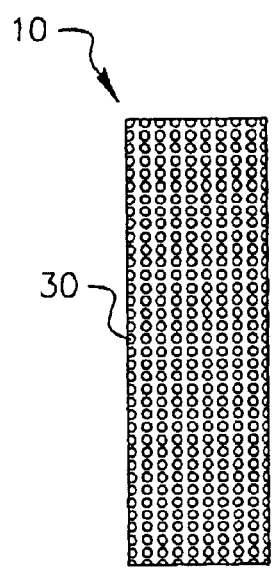
FIG. 5A is a top view of a display having a light modulating layer coated over a first transparent conductor.
Figure 5B:
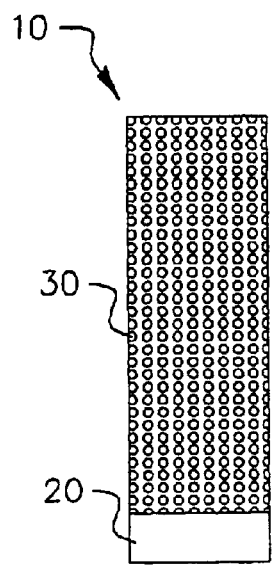
FIG. 5B is a top view of the display of FIG. 4A with a portion of the light modulating layer removed to show the first transparent conductor.
Figure 5C:
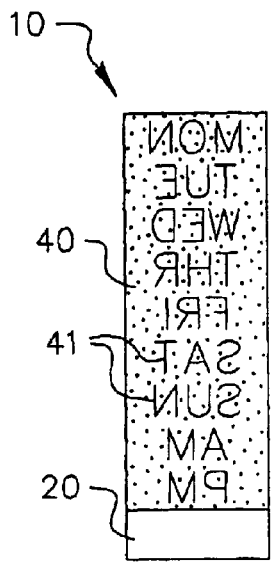
FIG. 5C is a top view of the display of FIG. 4B having a printed dielectric layer with unprinted image areas.

The process for manufacturing displays 10 is shown in FIGS. 5A–5F. FIG. 5A is a rear view of a substrate 15 supporting first transparent conductor 20 and light modulating layer 30. FIG. 5B is the structure from FIG. 5A after removal of a portion of light modulating layer 30 to reveal first transparent conductor 20. In the case of a gelatin and liquid crystal emulsion, light modulating layer 30 is removed by immersion in water and mechanical agitation. FIG. 5C is the structure of FIG. 5B after being printed with dielectric layer 40 having openings 41 defining image areas. Openings 41 in dielectric layer 40 expose areas of first transparent conductor 20.

Figure 5D:
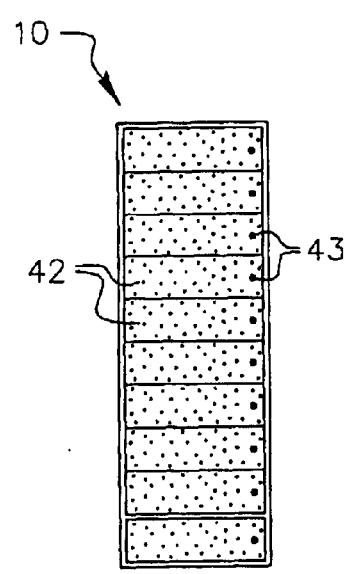
FIG. 5D is a top view of the display of FIG. 4C having second conductors printed over the dielectric layer.
Figure 5E:
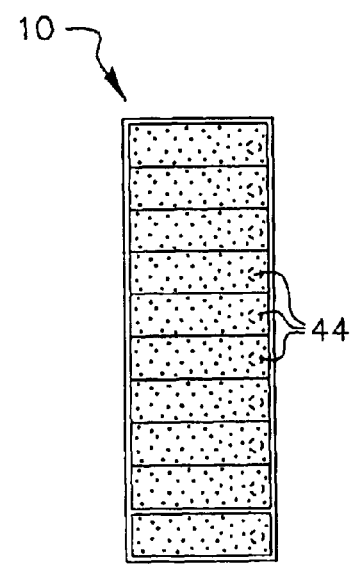
FIG. 5E is a top view of the display of FIG. 4D with contact strips attached to each second conductor.
Figure 5F:
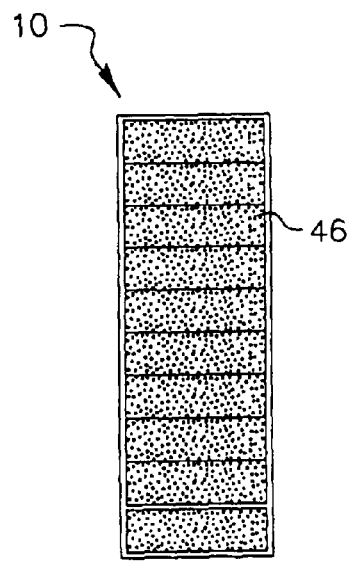
FIG. 5F is a top view of the display of FIG. 4E and having an applied adhesive coating.

FIG. 5D is the structure of FIG. 5C having a second conductor 42 printed over each indicia of display 10. Through holes 43 are perforated through the entire structure outside of the indicia but through each second conductor 42. FIG. 5E is the display 10 of FIG. 5D, after application of thin, metallic contact pads 44. Contact pads 44 can be 25 micron gold plated copper sheets having a conductive adhesive that bonds each contact pad 44 over each through hole 43. FIG. 5F is the display 10 of FIG. 5E further including an adhesive 46, such as a contact adhesive, coated over the display 10. The completed display 10 of FIG. 5F can be attached to an A/V cassette. The top nine contacts of the display correspond to the 7 days of the week and the morning and evening portions of each day. The bottom contact pad 44 provides an electrical ground to first transparent conductor 20.

Figure 6A:
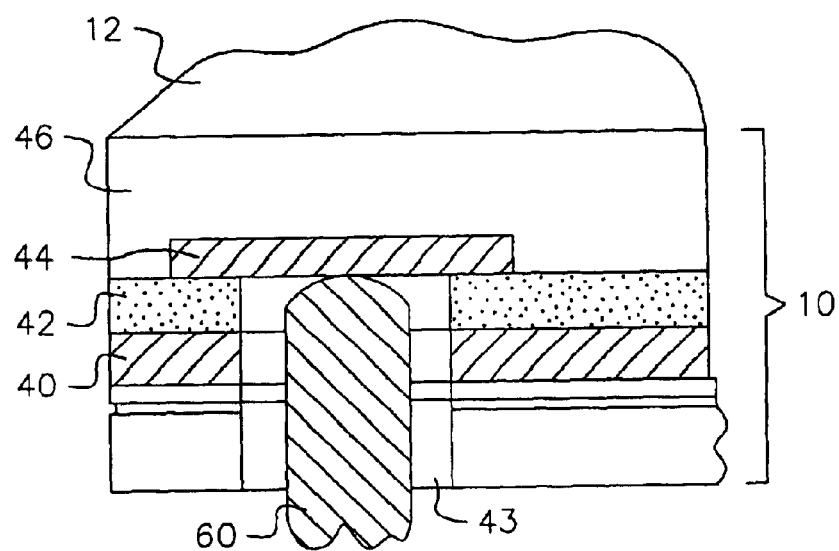
FIG. 6A is a sectional view of a contact strip connecting to a second conductor forming an image.
Figure 6B:
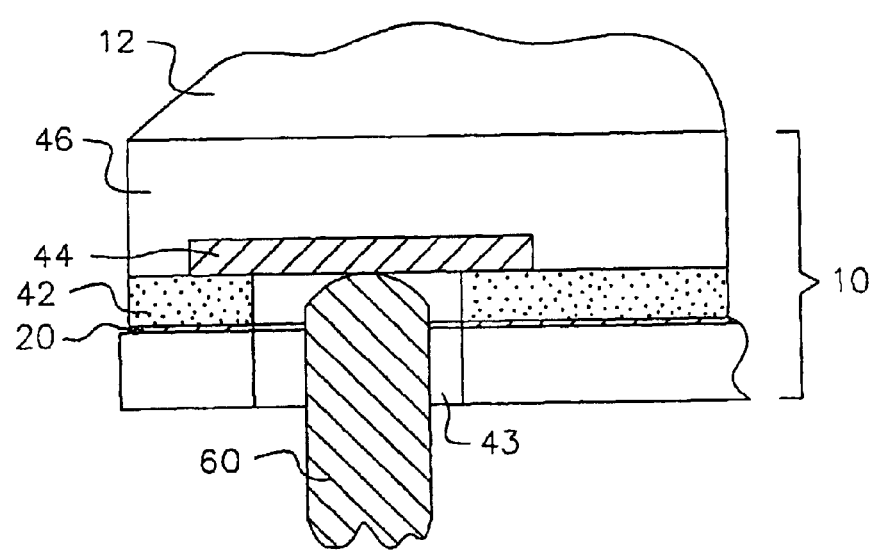
FIG. 6B is a sectional view of a contact strip connecting to a second conductor providing ground potential to the first transparent conductor.

FIG. 6A is a sectional view of display 10 showing electrical interconnect detail for the indicia. Contact 60 passes through hole 43 and engages contact pad 44. A contact pad 44 is bonded to each second conductor 42 for each indicia. FIG. 6B is a sectional view of the electrical interconnection to first transparent conductor 20. Contact 60 passes through hole 43 to connect with contact pad 44. Because dielectric layer 40 is not printed in the area and light modulating layer 30 has been removed, contact pad 44 is connected to first transparent conductor 20 to provide a ground field under each indicia.

Figure 7:
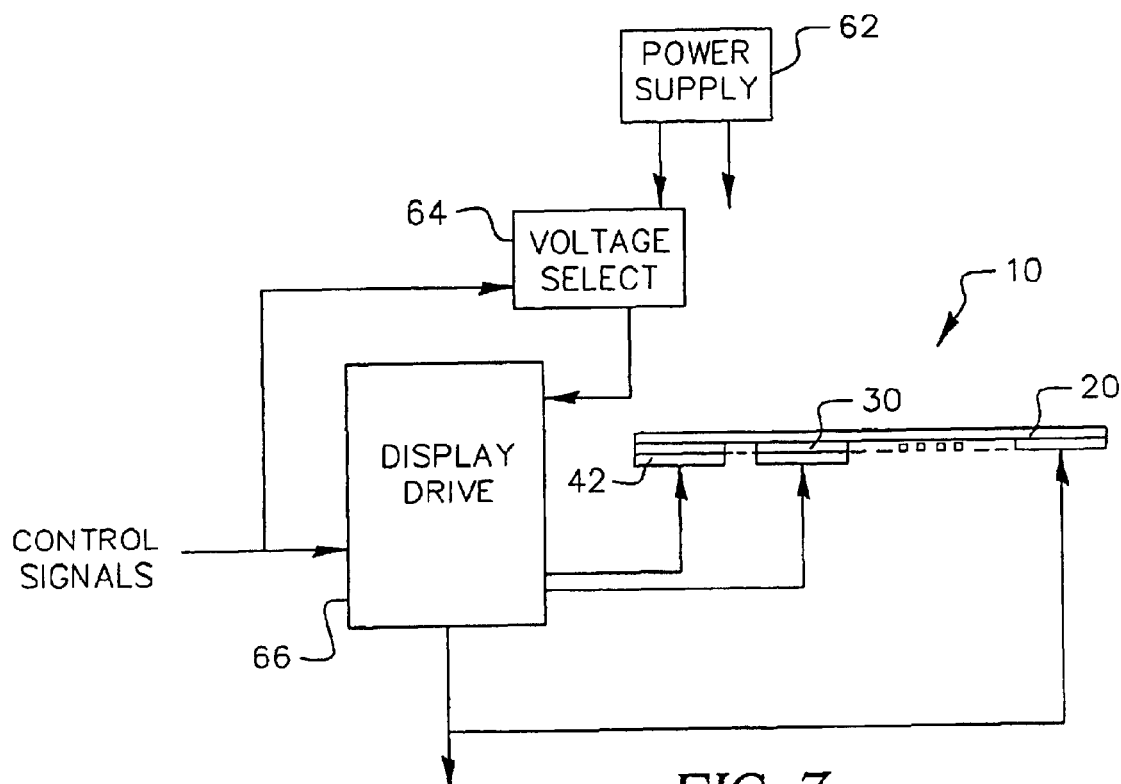
FIG. 7 is an electrical schematic of a circuit to write to display 10.

FIG. 7 is an electrical schematic of the circuitry used to write display 10. Contacts 60 pass through holes 43 to engage contact pads 44 as shown in FIGS. 6A and 6B. In FIG. 7, contact is made to the right most segment and connects first transparent conductor 20 to ground. The other segments are electrically connected to display drive 66. Power supply 62 generates two voltages, a first planar driving voltage and a second focal-conic voltage. A voltage select circuit 64 is used to select one of the two voltages. Voltage select circuit 64 can be as simple as a resistor network and a switching transistor. Control signals are applied to the voltage select circuit 64 and also to display drive 66. Display drive 66 is used to apply the selected voltage to appropriate segments of the display 10. In this way, the circuitry selectively addresses the different segment to cause them to be in an appropriate optical state for viewing or rewriting. Display drive 66 operates on a selected voltage from voltage selector 64 and applies either a ground or selected voltage to contacts 60. Display drive 66 can for example be embodied in a commercially available device known as HV57908PG from Supertex, Inc. of Sunnyvale, Calif.

Figure 8:
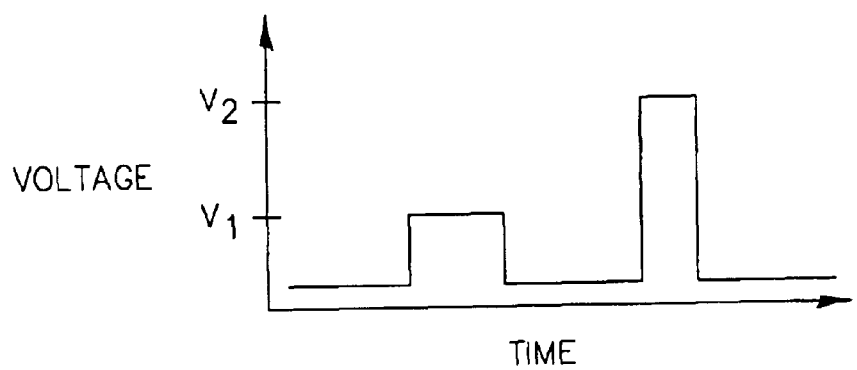
FIG. 8 is a plot of electrical waveforms used to write to display 10.

FIG. 8 is a diagram of the voltage waveform applied by display drive 66 to drive display 10. Voltage select circuit 64 is first set to the lower, focal-conic voltage V1 and all contacts 60 connected to second conductor 42 are receive a pulse of focal-conic voltage V1 to clear any reflective image from display 10. Voltage select circuit 64 is then set to apply a higher planar voltage V2 to display drive 66. Display drive 66 is then switched to apply planar voltage V2 across selected segments that are to be placed in the reflective, planar state. Those segments that are to remain non-reflective are not switched. The waveform shows the sequence of voltages that are used to write indicia into the planar state. Planar voltage V2 is omitted to maintain indicia in the clear focal-conic state. The drive method is a simple method of erasing and re-writing display 10.

The invention discloses an arrangement to use re-writable attachable time labels for rental devices such as audio-visual recording cassettes. The invention has been described in detail with particular reference to certain preferred embodiments thereof, but it will be understood that variations and modifications can be effected within the spirit and scope of the invention.

| PARTS LIST | |
|---|---|
| 10 | display |
| 12 | media cassette |
| 15 | substrate |
| 20 | first transparent conductor |
| 30 | light modulating layer |
| 40 | dielectric layer |
| 41 | openings |
| 42 | second conductors |
| 43 | through holes |
| 44 | contact pads |
| 46 | adhesive |
| 50 | planar liquid crystals |
| 52 | focal-conic liquid crystals |
| 54 | incident light |
| 56 | reflected light |
| 58 | light absorber |
| 60 | contacts |
| 62 | power supply |
| 64 | voltage select circuit |
| 66 | display drive |

What is claimed is:

1. A rewritable display, comprising:
   a) a transparent substrate;
   b) a first transparent conductor over the substrate;
   c) a layer including cholesteric liquid crystal material;
   d) a dielectric layer having openings;
   e) a second conductor provided over the dielectric layer and into the openings to be in contact with the cholesteric liquid crystal bearing layer which is effective at the position in the openings to be in at least first and second optical states so that written and viewed, be electrically changed by providing appropriate electrical fields to the material; and
   f) means for electrically addressing the cholesteric liquid crystal layer to erase previous information and writing appropriate information.

2. The rewritable display of claim 1 further including:
   g) means for attaching the display to an article so that the display functions as a label.

3. The rewritable display in claim 1 wherein the display can be viewed, only through the transparent substrate.

4. The rewritable display of claim 1 further including a second conductor which is electrically connected to the first transparent conductor.

5. A rewritable display, comprising:
   a) a plurality of electrically addressable segments, each of the segments including a transparent substrate, a first transparent conductor over the substrate, a layer including cholesteric liquid crystal material, a dielectric layer having openings and a second conductor provided over the dielectric layer and into the openings to be in contact with the cholesteric liquid crystal bearing layer which is effective at the position of each of the openings to be in at least first and second optical states so that information can be written, rewritten and viewed by providing appropriate electrical fields to the material; and
   b) means for selectively electrically addressing the cholesteric liquid crystal layer in each segment to erase previous information and write information.

6. The rewritable display of claim 5 further including:
   g) means for attaching the display to an article so that the display functions as a label.

7. The rewritable display in claim wherein the dielectric layer in each segment includes non-transparent material so that each individual segment can be viewed only through the transparent substrate.

8. The rewritable display of claim 5 further wherein one of the second conductors is electrically connected to the first transparent conductor of each segment.

9. The rewritable display of claim 2, wherein the article is a media cassette.

10. The rewritable display of claim 1, wherein the layer including cholesteric liquid crystal is written with alphanumeric indicia.

11. The rewritable display of claim 10, wherein the alphanumeric indicia is time, a day of the week, or a combination thereof.

12. The rewritable display of claim 5, wherein the layer including cholesteric liquid crystal in the segment is written with alphanumeric indicia.

13. The rewritable display of claim 12, wherein the alphanumeric indicia is time, a day of the week, or a combination thereof.

* * * * *